(12) United States Patent
Jensen et al.

(10) Patent No.: US 11,860,425 B2
(45) Date of Patent: Jan. 2, 2024

(54) REFLECTIVE TERMINATORS FOR OPTICAL NETWORKS AND METHODS OF MAKING THE SAME

(71) Applicant: Corning Research & Development Corporation, Corning, NY (US)

(72) Inventors: Joseph Clinton Jensen, Lawndale, NC (US); Martin Eugene Norris, Morganton, NC (US); Radawan Ripumaree, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 81 days.

(21) Appl. No.: 17/076,888

(22) Filed: Oct. 22, 2020

(65) Prior Publication Data

US 2021/0041634 A1    Feb. 11, 2021

Related U.S. Application Data

(63) Continuation of application No. PCT/US2019/028648, filed on Apr. 23, 2019.

(Continued)

(51) Int. Cl.
G02B 6/38    (2006.01)

(52) U.S. Cl.
CPC ........... *G02B 6/3845* (2013.01); *G02B 6/385* (2013.01); *G02B 6/3825* (2013.01);

(Continued)

(58) Field of Classification Search
CPC .. G02B 6/3845; G02B 6/3825; G02B 6/3831; G02B 6/3846; G02B 6/3849;

(Continued)

(56) References Cited

U.S. PATENT DOCUMENTS

| | | | |
|---|---|---|---|
| 5,619,610 A | * | 4/1997 | King ................... G02B 6/3818 385/139 |
| 7,090,406 B2 | | 8/2006 | Melton et al. |

(Continued)

FOREIGN PATENT DOCUMENTS

| | | |
|---|---|---|
| CN | 202837593 U | 3/2013 |
| CN | 206421066 U | 8/2017 |

(Continued)

OTHER PUBLICATIONS

Corning Optical Communications LLC., "Pluggable Filter WDM with Retro Reflect", Spec Sheet CAH-133_AEN, Revision date Nov. 23, 2016, 3 pages.

(Continued)

*Primary Examiner* — John Bedtelyon
(74) *Attorney, Agent, or Firm* — Michael E. Carroll, Jr.

(57) ABSTRACT

Optical terminators comprising a ferrule assembly with an optical filter for providing a reflective event in an optical network are disclosed. The optical filter assembly reflecting one or more preselected wavelengths so that the service provide can test optical links in an unmated connection node of the optical network. In one embodiment, the optical terminator has a hardened connector interface for outside plant applications. A ferrule assembly comprises the optical filter, and at least a portion of the ferrule assembly is disposed within the connector housing of the optical terminator. In another embodiment the connector housing comprises a locking feature integrally formed into the body of the connector housing for securing the reflective terminator. Other embodiments comprise a sealing element for sealing a rear end of the reflective terminator, a plug end of an outer housing having first and second fingers, and a coupling nut disposed about a portion of the outer housing. The optical terminator advantageously allows the network operator to test and determine the operation of a branch of the optical (Continued)

network without having to send a technician to physically visit and test the operation of the desired link in the optical network.

27 Claims, 15 Drawing Sheets

Related U.S. Application Data

(60) Provisional application No. 62/662,946, filed on Apr. 26, 2018.

(52) U.S. Cl.
CPC ......... *G02B 6/3831* (2013.01); *G02B 6/3846* (2013.01); *G02B 6/3849* (2013.01); *G02B 6/3894* (2013.01)

(58) Field of Classification Search
CPC .... G02B 6/385; G02B 6/3894; G02B 6/3869; G02B 6/389; G02B 6/29368; G02B 6/3895; G01M 11/31; G01M 11/3154
See application file for complete search history.

(56) References Cited

U.S. PATENT DOCUMENTS

| | | |
|---|---|---|
| 7,113,679 B2 | 9/2006 | Melton et al. |
| 7,330,624 B2 | 2/2008 | Isenhour et al. |
| 9,229,170 B1 | 1/2016 | Wang et al. |
| 11,092,753 B2 * | 8/2021 | Jensen ................. G02B 6/3894 |

FOREIGN PATENT DOCUMENTS

| | | |
|---|---|---|
| EP | 2264420 A1 | 12/2010 |
| JP | 2010-002931 A | 1/2010 |
| WO | 2018/017458 A1 | 1/2018 |
| WO | 2018/071458 A1 | 4/2018 |

OTHER PUBLICATIONS

International Search Report and Written Opinion of the International Searching Authority; PCT/US2019/028648; dated Oct. 14, 2019, 22 pages; European Patent Office.

* cited by examiner

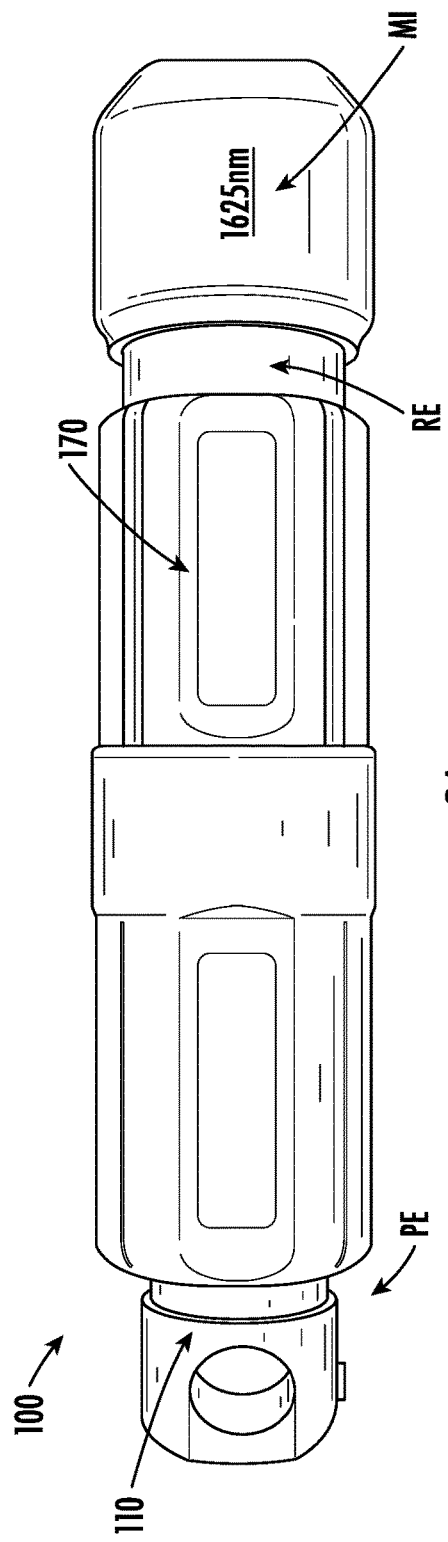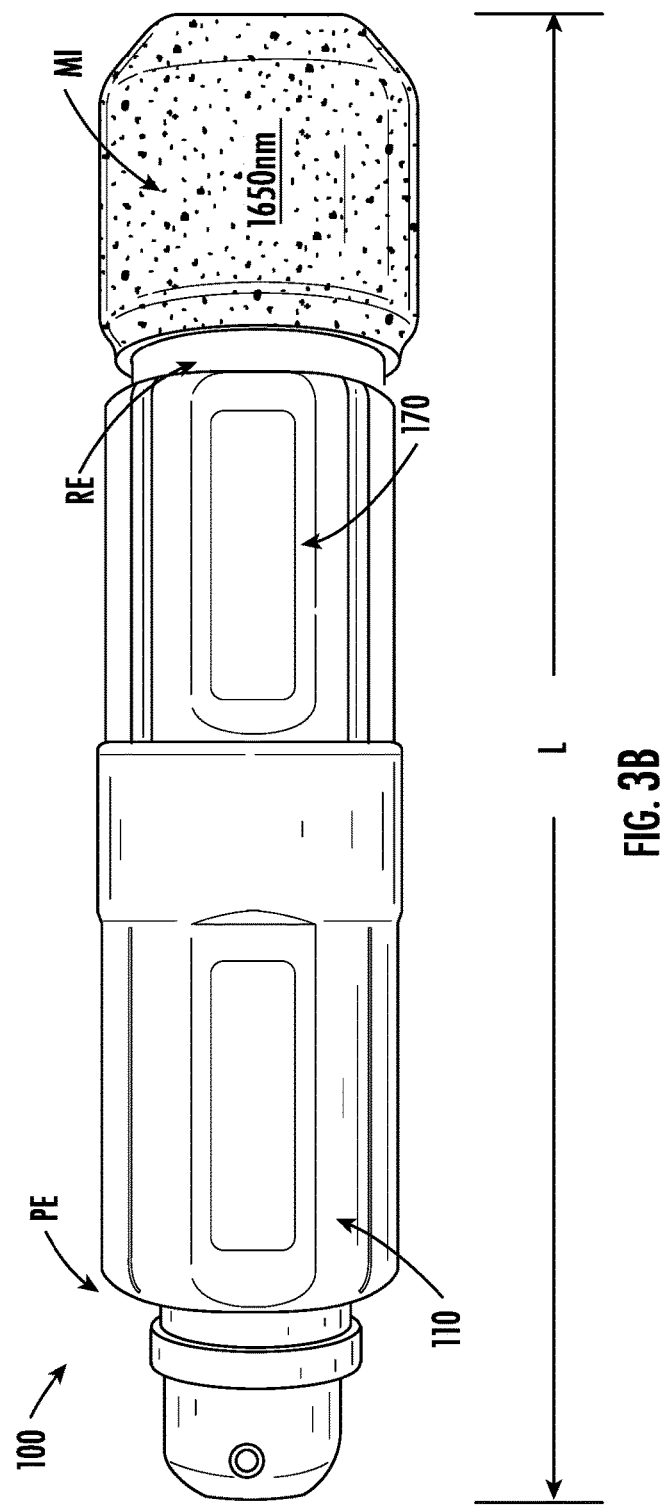

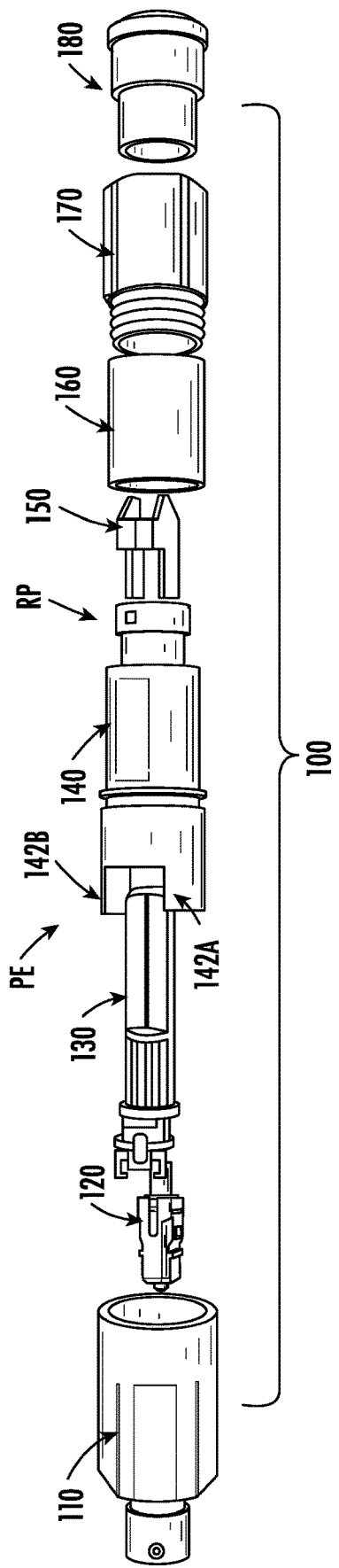

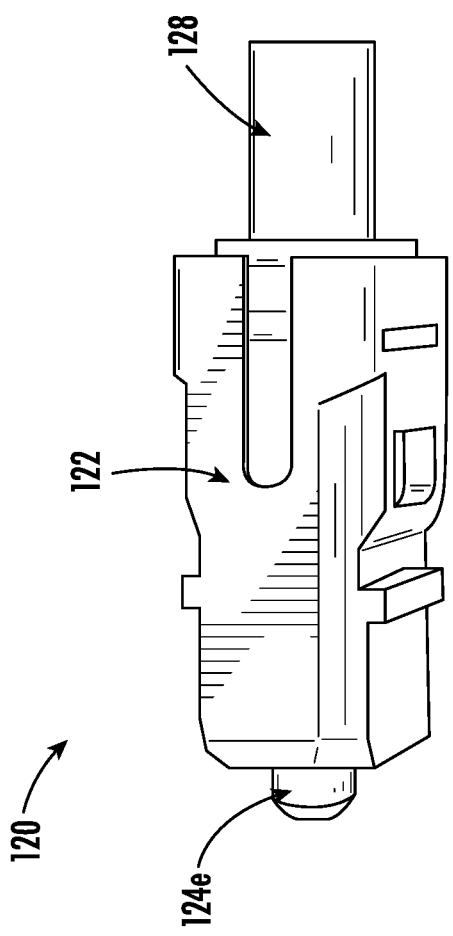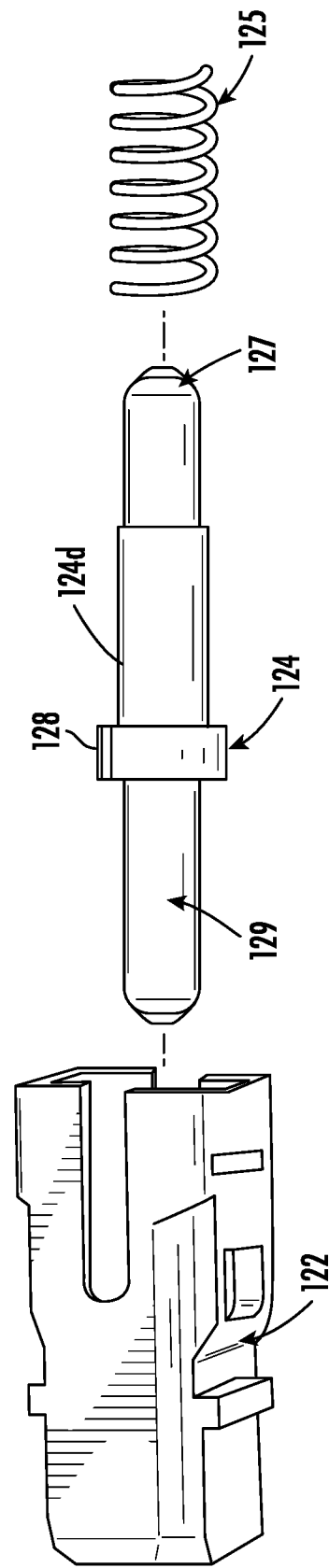

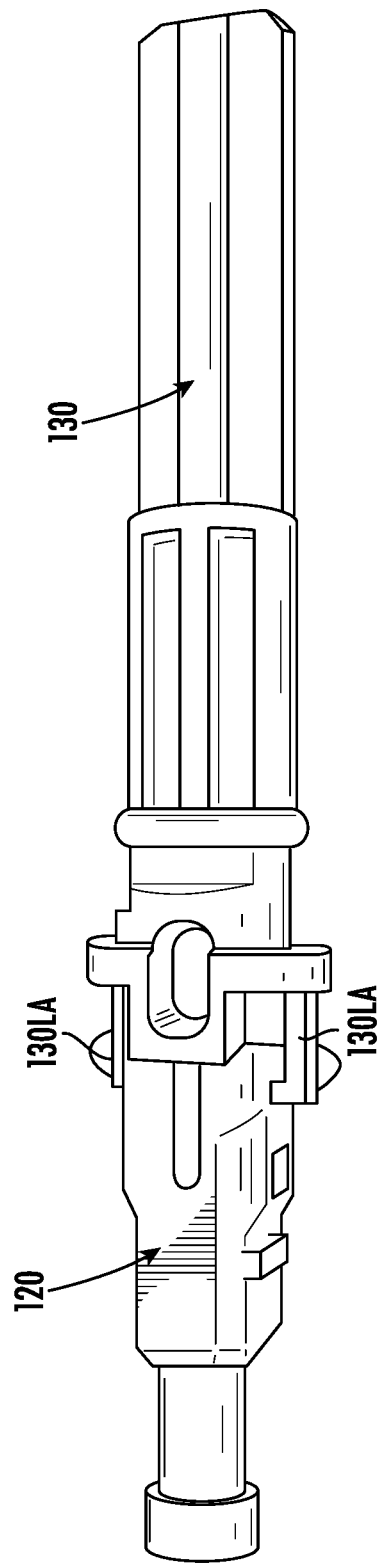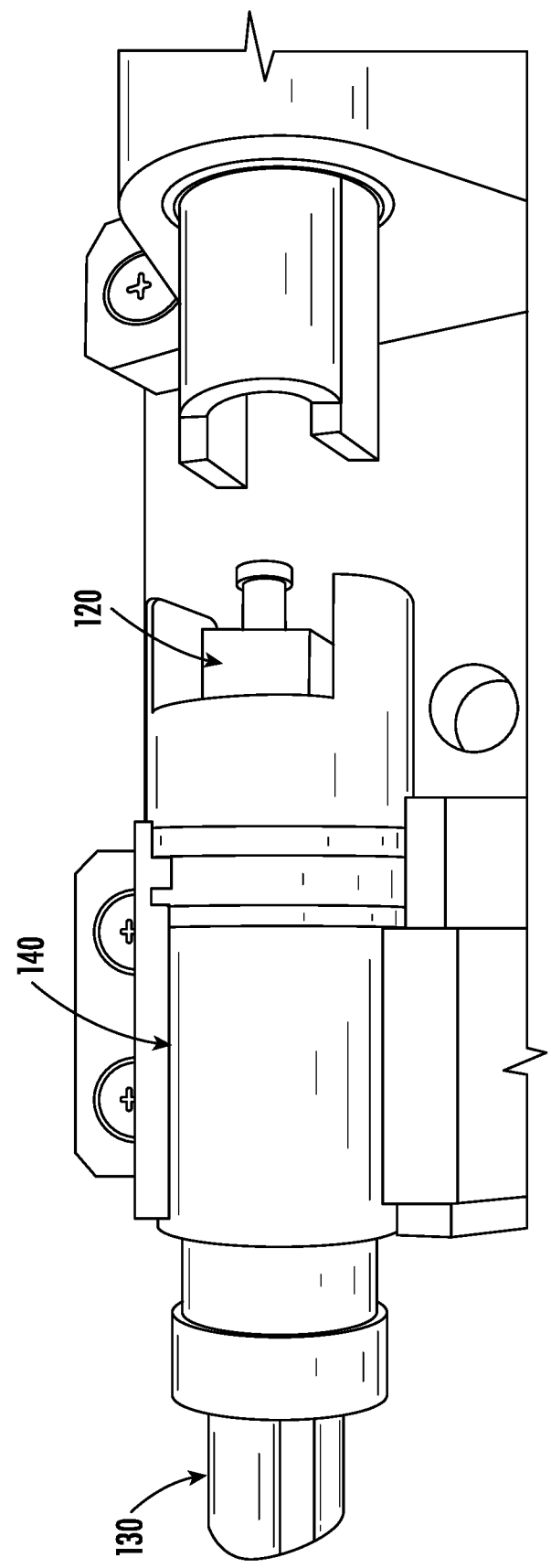
FIG. 8
FIG. 9

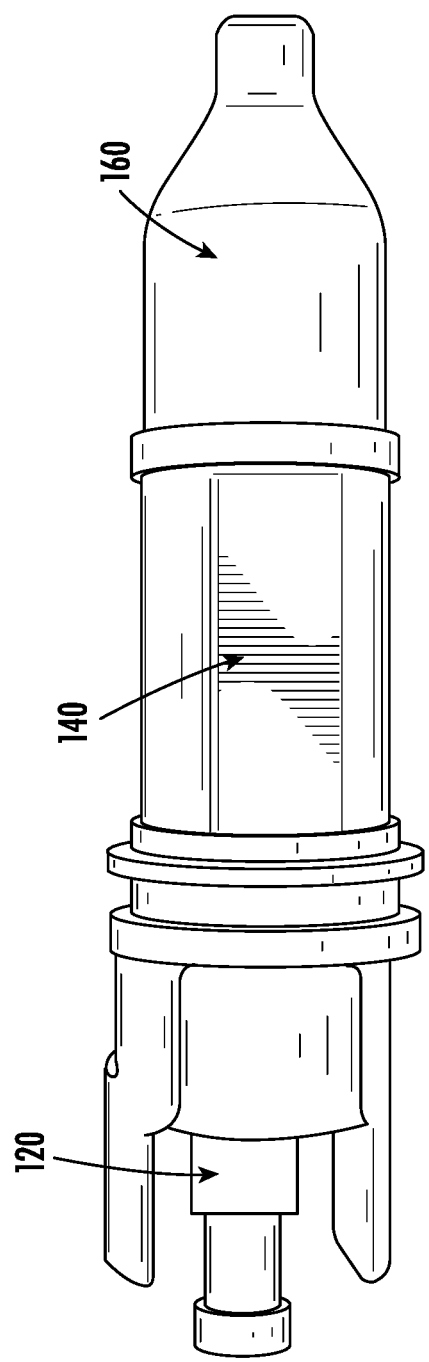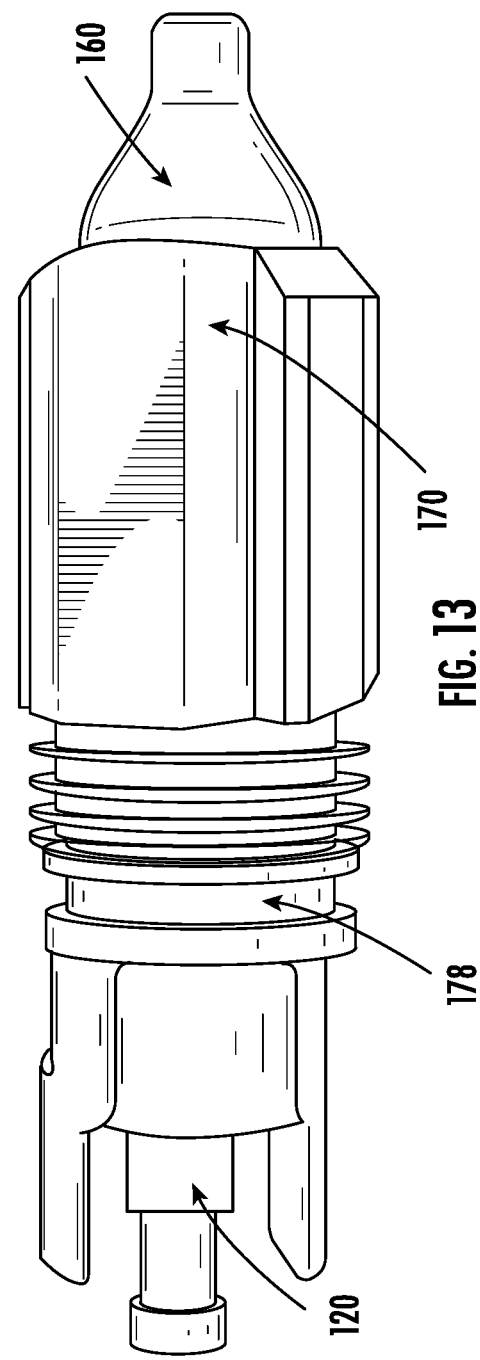

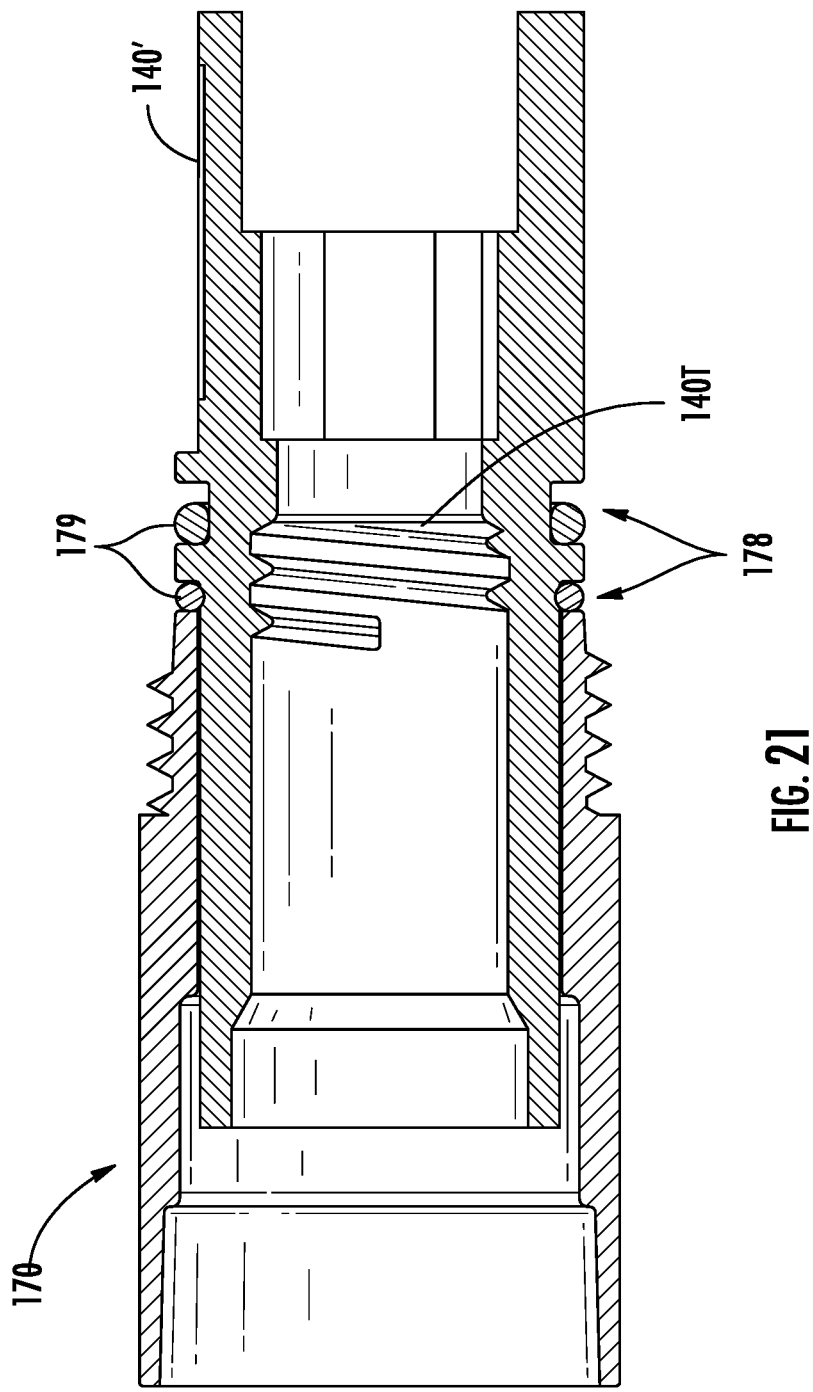

US 11,860,425 B2

REFLECTIVE TERMINATORS FOR OPTICAL NETWORKS AND METHODS OF MAKING THE SAME

RELATED APPLICATIONS

This application is a continuation of International Application No. PCT/US2019/028648 filed Apr. 23, 2019, which claims the benefit of priority to U.S. Provisional Application Ser. No. 62/662,946, filed Apr. 26, 2018, the content of each of which is relied upon and incorporated herein by reference.

BACKGROUND

The disclosure is directed to reflective terminators having a ferrule assembly with an optical filter along with optical networks using the reflective terminator. More specifically, the disclosure is directed to reflective terminators having a ferrule assembly with an optical filter that reflects one or more specific optical wavelengths so the service providers have further versatility in monitoring and verifying links in their optical networks.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, North Carolina, such as disclosed in U.S. Pat. Nos. 7,090,406 and 7,113,679 (the '406 and '679 patents) and incorporated herein by reference. The Optitap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as a SC connector.

In order for the service providers to monitor and verify links in optical networks there have been reflective devices that have been incorporated in connectors. As an example, optical connectors have used dust caps with a reflector in the dust cap to monitor the optical network. The reflective device in the dust cap returns a portion of the optical signal back through the optical fiber back to the central office or head end to determine if the optical link is continuous. However, this type of reflective device in a dust cap is only operational when the dust cap is installed on the connector and is not operational when the dust cap is removed from the connector. Consequently, the reflective device in the dust cap of the connector is rendered useless when the connector is in a mated condition. Other reflective devices were developed for creating reflective events in an optical network. By way of example, reflective devices may be disposed in-line of a mated optical connection between a hardened plug connector and a receptacle in a mated condition.

FIGS. 1A-1C are prior art depictions showing various stages of mating of a preconnectorized cable 10 having a plug connector 5 such as an OptiTap® connector with a receptacle 30. Receptacle 30 mates plug connector 5 with a standard SC connector (i.e., a non-hardened connector) at a second end (not visible in these views) using an adapter sleeve for aligning ferrules when mating plug connector 5 with a non-hardened connector. Protection of the non-hardened connector side of the receptacle is typically accomplished by mounting the receptacle 30 through a wall of an enclosure or the like so that the non-hardened end of the receptacle is disposed inside the enclosure for environmental protection of the non-hardened connector. As shown by FIGS. 1A-1C, the other end of the receptacle 30 is accessible for receiving the plug connector 5 at the wall of the enclosure. Other applications may mount the receptacle 30 inside an enclosure on a bracket or the like.

Receptacle 30 allows an optical connection between the hardened connector such as the OptiTap® male plug connector with a non-hardened connector such as the SC connector at nodes in the optical network that typically transition from an outdoor space to an indoor space. Receptacle 30 is described in further detail in U.S. Pat. No. 6,579,014, which is incorporated herein by reference. As depicted, receptacle 30 includes a receptacle housing 12 and an adapter sleeve 18 disposed therein. The receptacle 30 receives a non-hardened connector at a second end 16 as represented by the arrow pointing to the left.

Network operators often desire to optically test a link in an optical network to verify service (e.g., troubleshoot) when a connector is in a mated condition. Testing when the connector when in the mated condition may be difficult for the network operator and may requires a technician to test the link at the connector location in the optical network, which is expensive and time-consuming to send a technician into the field for testing. WO2018/017458 discloses reflective devices that are connected in-line with the optical connection between the hardened plug connector 5 and the receptacle 30 in a mated condition.

However, service providers have needs for monitoring optical networks where there is not a connector and receptacle in a mated condition.

SUMMARY

The disclosure is directed to a reflective terminator device comprising a ferrule assembly comprising an optical filter for reflecting one or more preselected wavelengths and a connector housing. The ferrule assembly is at least partially disposed within the connector housing comprising a body, and the connector housing comprises a locking feature integrally formed in the body of the connector housing for securing the reflective terminator.

The disclosure is also directed to a reflective terminator device comprising a ferrule assembly comprising an optical filter for reflecting one or more preselected wavelengths, a connector housing, and an outer housing. The ferrule assembly is at least partially disposed within the connector housing and the outer housing has a passageway and a plug end, where the plug end comprises a hardened connector interface. At least a portion of the connector housing is disposed within the passageway of the outer housing.

The disclosure is also directed to a reflective terminator device comprising a ferrule assembly comprising an optical filter for reflecting one or more preselected wavelengths, a connector housing, and an outer housing. The ferrule assembly is at least partially disposed within the connector housing and the outer housing has a passageway and a plug end, where the plug end comprises a hardened connector interface. At least a portion of the connector housing is disposed within the passageway of the outer housing and a sealing element is disposed on a rear portion of the outer housing.

The disclosure is also further directed to a reflective terminator device comprising a ferrule assembly comprising an optical filter for reflecting one or more preselected wavelengths, a connector housing, an outer housing, and a coupling nut disposed about a portion of the outer housing. The optical filter comprises a thin film coating for reflecting the one or more preselected wavelengths. The ferrule assembly is at least partially disposed within the connector housing and the outer housing has a passageway and a plug end, where the plug end comprises a hardened connector interface. A plug end of the outer housing comprises at least one opening extending from the plug end to a medial portion of the outer housing, a first finger, and a second finger. At least a portion of the connector housing is disposed within the passageway of the outer housing and a sealing element is disposed on a rear portion of the outer housing.

The reflective terminators disclosed allow testing a link of an optical network without having a mated connection at a connector node.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description explain the principles and operation.

BRIEF DESCRIPTION OF THE FIGURES

FIGS. 3A and 3B respectively show two different explanatory reflective terminators for a first connector footprint that reflect optical signals at two different wavelengths along with respective wavelength marking indicia on the reflective terminator for identification of the reflective wavelength;

FIG. 4 is a partially exploded view of the reflective terminator of FIG. 3A;

FIG. 5 is a perspective view of the connector assembly of FIG. 4 having a connector housing with a ferrule assembly with an optical filter for reflecting one or more preselected wavelengths;

FIG. 6 is a partially exploded view of the reflective assembly of FIG. 5;

FIGS. 8-15 are views showing the assembly of the reflective terminator of FIGS. 3A and 3B;

FIG. 21 is a cross-sectional view of the outer housing and coupling nut shown in FIG. 20 for converting the connector footprint for the reflective terminator.

DETAILED DESCRIPTION

Reference will now be made in detail to the embodiments of the disclosure, examples of which are illustrated in the accompanying drawings. Whenever possible, like reference numbers will be used to refer to like components or parts.

The concepts for the reflective terminator described herein are suitable for creating optical reflective events at one or more predetermined wavelengths using an optical filter. Although, the reflective terminators disclosed are explained and depicted with a specific connector footprint the concepts may be used with other types of connector footprints such as a DLX™ connector footprint or the like. The concepts disclosed advantageously allow the placement of robust and reliable reflective terminator at connection nodes of an optical network in a removable, replaceable and scalable manner without a mated connection or having a dust cap on a connector node. The disclosed reflective terminators are useful for testing an optical network by sending an optical signal from the central office (i.e, an upstream location) to a network location having the reflective terminator and having an optical reflection return to the central office if the optical link is continuous.

Some of the concepts disclosed herein are explained with respect to well-known commercial solutions for Fiber-to-the-Home applications but are equally applicable to other architectures or applications. Specifically, the reflective terminator is explained in an embodiment for insertion into OptiTap® receptacle, but the concepts disclosed herein may be used with other fiber optic connector interfaces hardened or not and are not limited to this particular optical connection. By way of explanatory example, other embodiments suitable for use with another connector form-factors such as a FASTConnect® are possible.

Figure 1A:
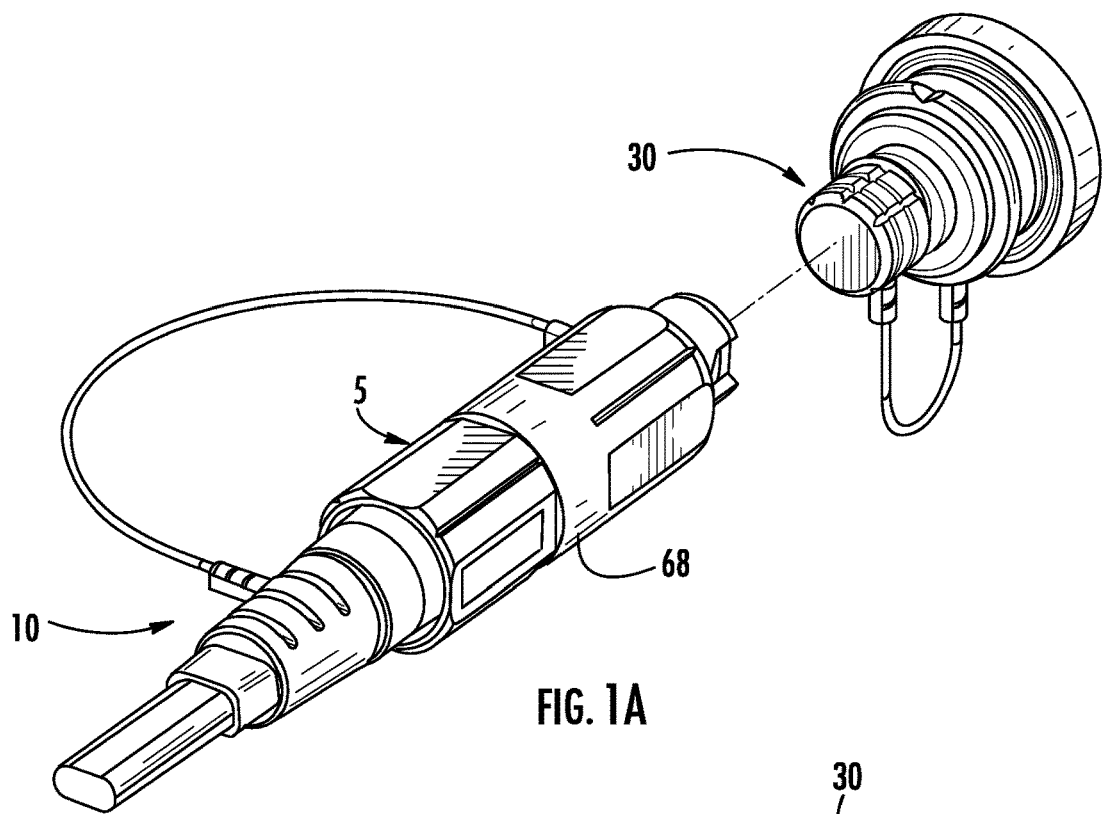
FIGS. 1A-1C are prior art depictions showing various stages of mating of a preconnectorized cable having a plug connector with a receptacle.
Figure 1B:
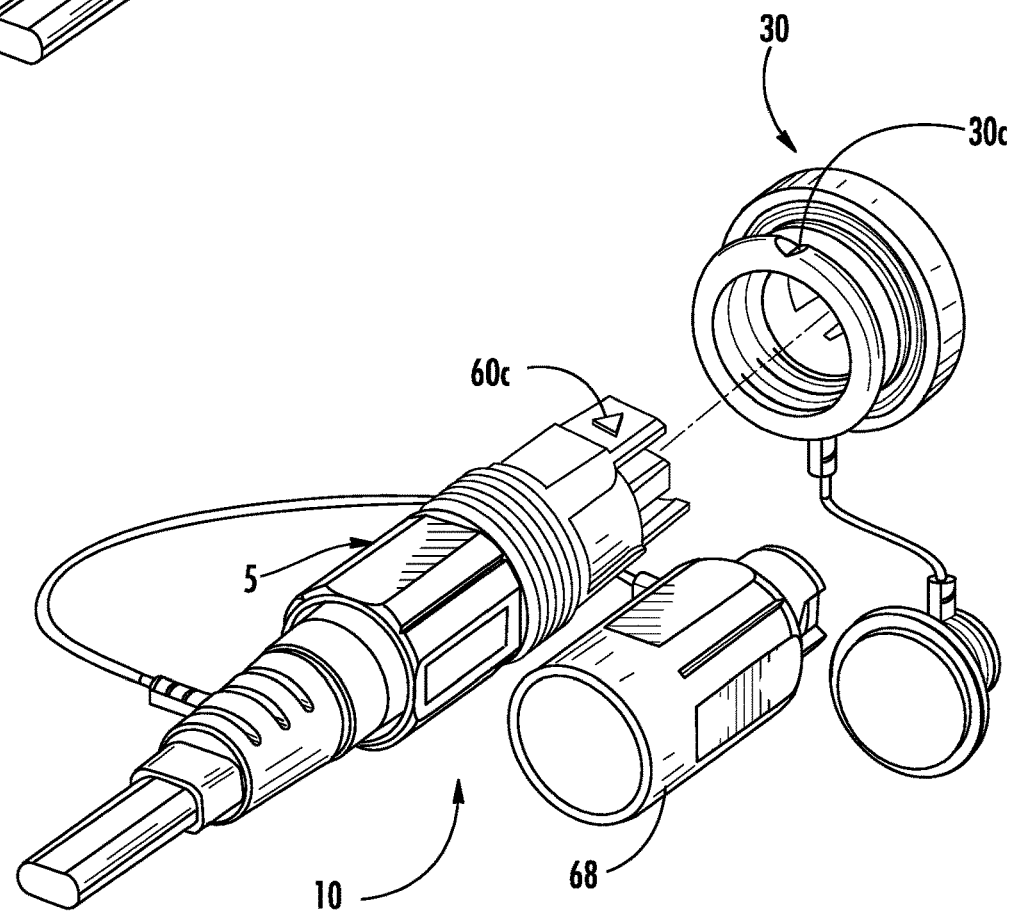
Figure 1C:
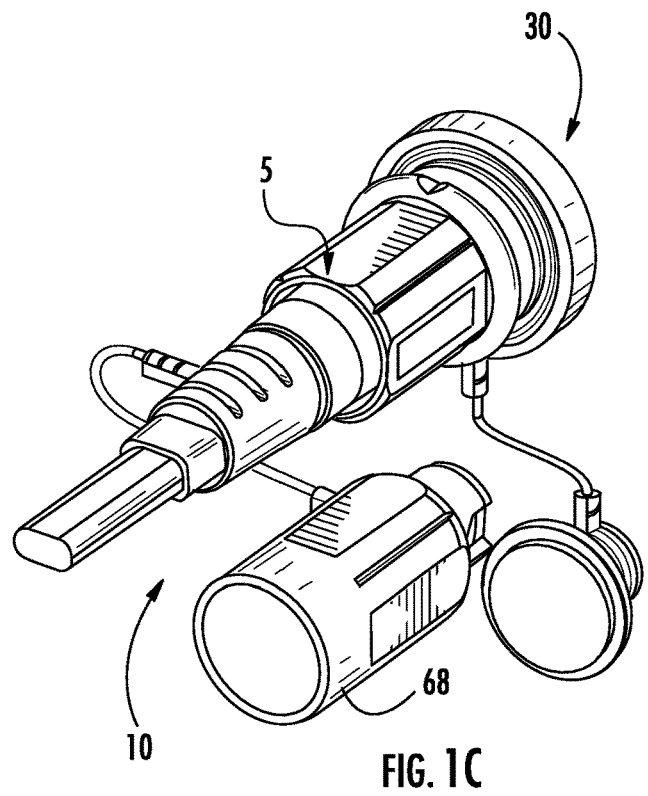
Figure 2:
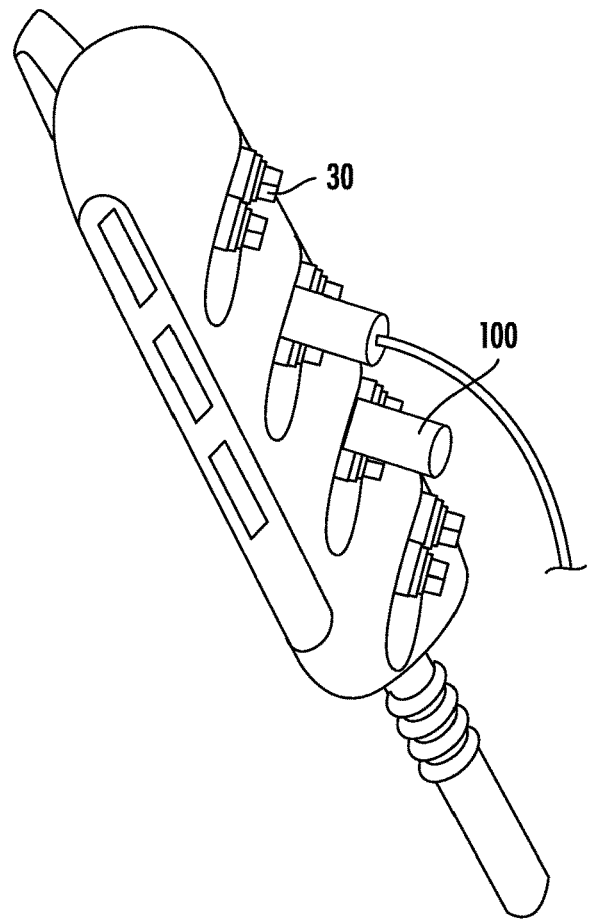
FIG. 2 depicts a multiport having a reflective terminator disposed in one of the ports according to the concepts of the present application.

FIG. 2 shows an explanatory environmental perspective view of reflective terminator 100 disclosed herein as a portion of an optical network, but the reflective terminator 100 may be used in other environments as well. Specifically, FIG. 2 depicts a multiport 1 having one or more receptacles 30 disposed through a wall of the multiport 1. Receptacles 30 are suitable for making optical connections with preconnectorized cables 10 having plug connector 5. However, when deployed in the field not all of the receptacles 30 may have a plug connector 5 mated with the respective receptacles 30, but the service provider may still have a need to test the optical network. The present application addresses this unresolved need by providing a reflective terminator 100 that may be disposed into an unmated receptacle 30, and still reflect a test signal upstream for testing purposes. As shown, reflective terminator 100 is disposed in one of the receptacles 30 ports for reflecting one or more preselected wavelengths upstream in the optical network for testing the operation of the network by the service provider according to the concepts disclosed. Reflective terminators according to the concepts disclosed are advantageous since testing may occur even though there is not a mated connection. Further, a quick visual inspection can determine that the reflective terminator is present without going up a ladder in aerial deployments, and buried applications are also easy to identify that a reflective terminator is present.

FIGS. 3A and 3B respectively show two different explanatory reflective terminators 100 that reflect optical signals at two different wavelengths. The concepts disclosed herein may be used with any suitable wavelength as desired. Reflective terminators 100 in FIGS. 3A and 3B are shown with dust cap 110 installed about a plug end PE of the device along with respective wavelength marking indicia MI on the rear end RE of the reflective terminator for identification of the reflective wavelength. Of course, other wavelength marking indicia MI are possible, but brightly colored wavelength marking indicia MI allow identification of the reflected wavelength of the device from a distance such as from the ground when the multiport is disposed on a pole in an aerial deployment.

FIG. 3A shows a reflective terminator 100 having an optical filter for reflecting an optical wavelength of 1625 nanometers, and FIG. 3B shows a reflective terminator 100 having an optical filter for reflecting an optical wavelength of 1650 nanometers. However, the concepts of the present application may be used with reflective terminators that reflect other suitable wavelengths as desired. Further, the optical filter may be any suitable type such as a high-pass, low-pass, bandpass, etc or construction such as a thin film coating, a grating on the fiber, etc.

When not in use, dust cap 110 is installed on the reflective terminator for protecting the interface of the device from dust, debris or damage. Specifically, dust cap 110 is attached to the coupling nut 170 as depicted in FIGS. 3A and 3B using any suitable structure. In this embodiment, dust cap 110 has a threaded portion that cooperates with complimentary threads on coupling nut 170 (FIG. 4), but other suitable structures are possible. Specifically, coupling nut 170 is disposed about a portion of the outer housing 140 and may rotate with respect to the outer housing for securing the dust cap 110 or securing the reflective terminator 100 to receptacle 30 after the dust cap 110 is removed. Depending on the interface, coupling nut 170 may comprises a bayonet, threaded portion or the like for securing the reflective terminator 100 to a suitable port or receptacle 30 for aligning and mating the ferrule assembly 124 for reflecting optical signals.

Figure 7:
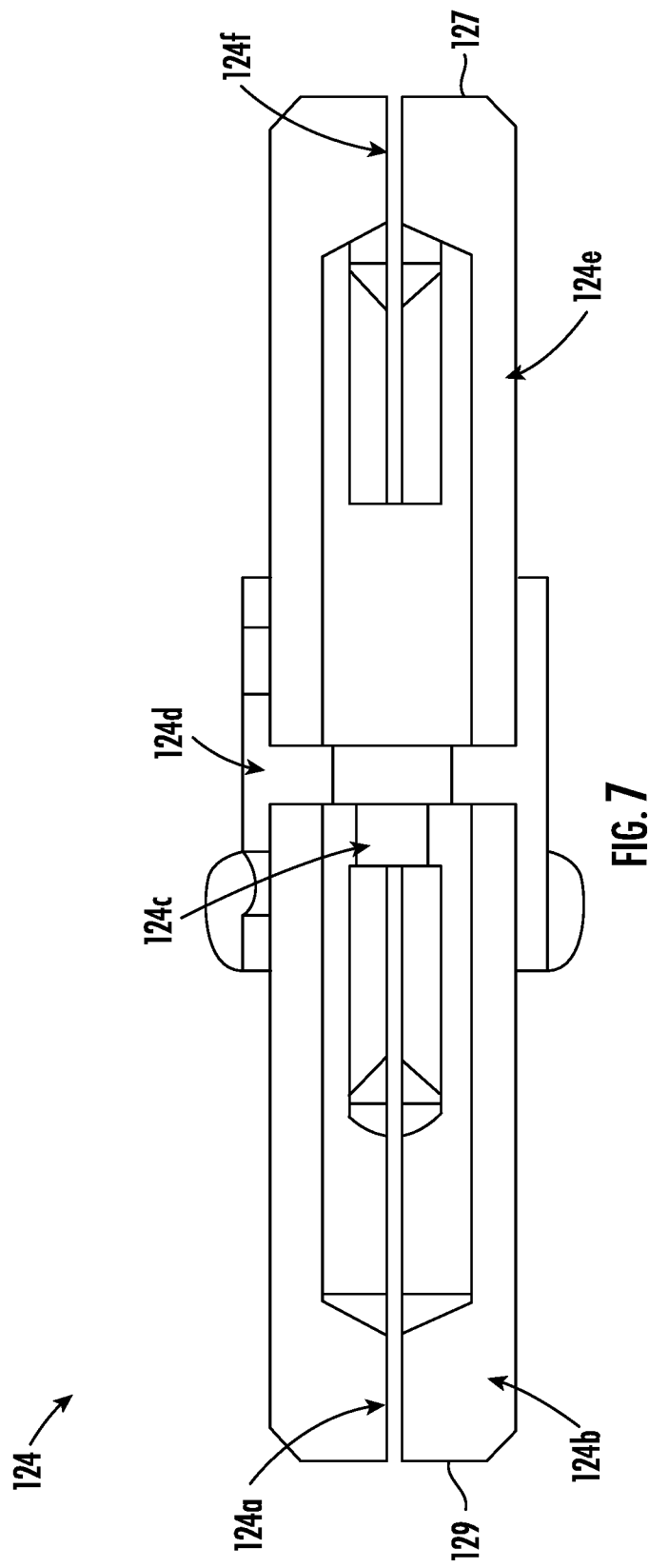
FIG. 7 is a schematic view of the ferrule assembly of FIG. 6.

FIG. 4 is a partially exploded view of the explanatory reflective terminator 100 depicted in FIG. 3A. Reflective terminator 100 comprises ferrule assembly 124, a connector housing 122 and outer housing 140. As shown in FIG. 7, the ferrule assembly 124 comprises an optical filter for reflecting one or more preselected wavelengths. The ferrule assembly 124 and connector housing 122 may be a portion of a connector assembly 120 as shown, but other constructions are possible. Reflective terminator may also comprise a body 130 for attaching connector assembly 120, a bushing 150 that fits into a rear opening of outer housing 140, a sealing element 160 such as a heat shrink for sealing the rear end of the outer housing 140, coupling nut 170 and an end cap 180. End cap 180 attaches at the rear end of the outer housing 140 and inhibits the coupling nut 170 from sliding off the outer housing 140.

Plug end PE of outer housing 140 has a similar connector interface as plug connector 5 for being received in receptacle 30 and mating with the SC connector inserted into the other end of the receptacle 30 so that the optical test signal may be reflected back upstream. Thus, optical filter creates a reflective event location in the optical network at the connection node, in this case, near receptacle 30 as shown in FIG. 2. Moreover, the reflective terminator 100 may be moved, added, or replaced at the connection node as desired by the network operator.

Reflective terminator 100 disclosed advantageously uses several of the components that are similar to the parts used for the OptiTap plug connector so that fewer new parts are needed, but this is not necessary.

Other constructions are possible for reflective terminator 100 using the concepts disclosed herein. For instance, the number of parts shown in FIG. 4 may be reduced by forming a plurality parts as a single part. By way of explanation, body 130, outer housing 140, bushing 150 and/or sealing element 160 may be formed as a single part. Likewise, the coupling nut 170 and end cap 180 may be formed as a single part, instead of separate parts. Other components may also function as the wavelength marking indicia. For instance, end cap 180 may have a colored code for identification of the preselected reflective wavelength of the device.

Outer housing 140 (or shroud) has a passageway between a plug end PE and a rear portion RP. Plug end PE comprises at least one opening 142 extending from the plug end PE to a medial portion of the outer housing 140. This allows the outer housing to cooperate with the adapter that is part of the receptacle 30 when mated. The plug end PE also comprises a first finger 144A and a second finger 144B for keying the orientation of the reflective terminator 100 with the receptacle 30. The first finger 144A and the second finger 144B have different cross-sectional shape for keying the orientation of the reflective terminator 100. Body 130 is keyed for insertion into the passageway of outer housing 140 in only one orientation. Body 130 secures the connector assembly 120 when assembled. Outer housing 140 may be monolithically formed or formed from a plurality of components as desired. Reflective terminator may have a relatively short length L such as 100 millimeters or less.

FIG. 5 is a perspective view of the connector assembly 120 of FIG. 4 and FIG. 6 is a partially exploded view of connector assembly 120. Connector assembly 120 comprises a connector housing 122 with a ferrule assembly 124 comprising an optical filter for reflecting one or more preselected wavelengths. Ferrule assembly 124 reflects one or more preselected optical wavelengths back to the head end of the optical network for testing the optical link. The preselected wavelengths that pass could having any suitable pass band required by the service provider. By way of non-limiting example, the ferrule assembly 110 may be suitable for passing 1310 nanometers (nm) and 1550 nm wavelength ranges and reflecting wavelengths in the 1625 nm range, but this is not necessary since there is no downstream connection. Consequently, the service operator can test the optical link to the connection node having reflective terminator 100 using a wavelength in the 1625 nm range that reflects back. Reflective terminator 100 may reflect one or more predetermined wavelengths by using any suitable structure such as a Bragg grating on an optical waveguide of the device or a thin film coating.

In this embodiment, connector housing 122 has a SC form-factor, but other form-factors are possible for the connector housing with other connector interfaces such as a LC form-factor. Connector assembly 120 may also comprise a resilient member 125 such as a coil spring to bias ferrule assembly to a forward position, and a spring push 128. As shown in FIG. 5, the ferrule assembly 124 is at least partially disposed within the connector housing 122.

FIG. 7 is a schematic view of the explanatory ferrule assembly 124 of FIG. 6, and other constructions of ferrule assemblies comprising an optical filter are possible. As best shown in FIGS. 6 and 7, ferrule assembly 124 comprises a first end 129 and a second end 127. The first end 129 comprises a first ferrule 124b having an end face and a second end 127 comprising a second ferrule 124e comprising an end face. The ferrule assembly 124 also comprises a ferrule holder 124d for securing the first ferrule 124b and the second ferrule 124e. As best depicted in FIG. 6, a key 128 is disposed on the ferrule holder 124d. First ferrule 124b secures an optical fiber 124a that is in optical communication with an optical filter 124c as shown. In this embodiment, the optical filter 124c comprises a thin film coating for reflecting one or more preselected wavelengths such as 1625 nanometers. In other embodiments, other ferrule assemblies may have the optical filter formed by an optical fiber comprising a Bragg grating, but still other constructions are possible for the optical filter.

Figure 10:
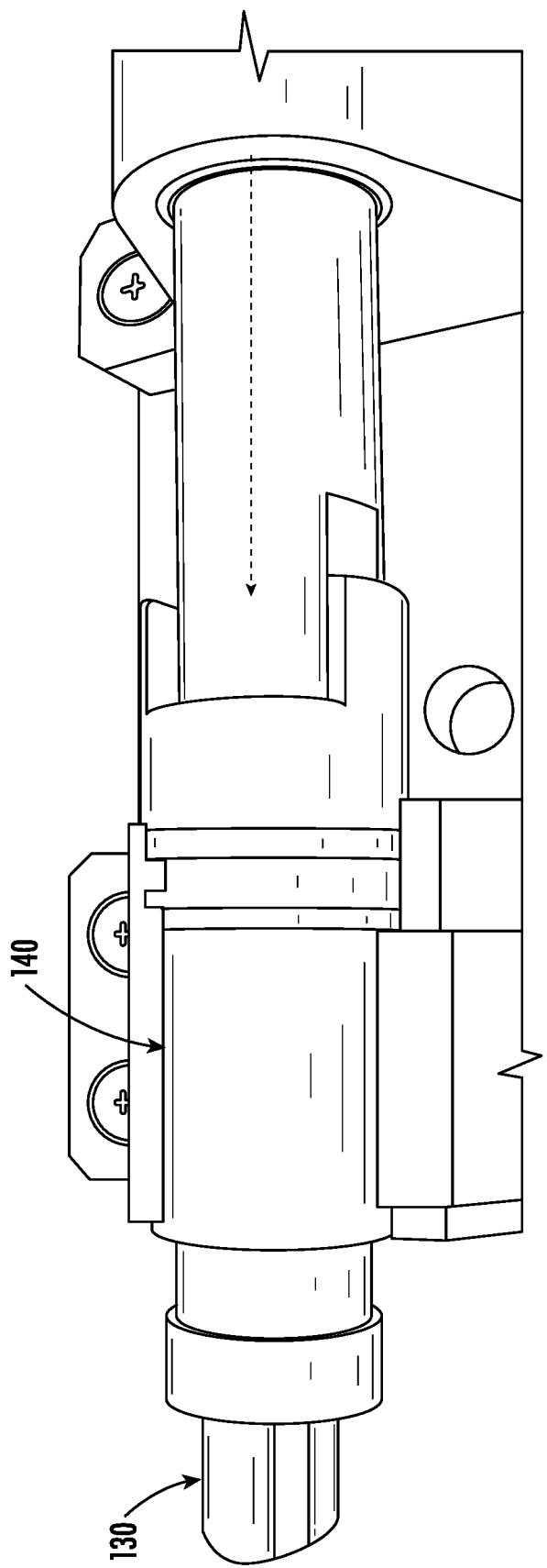
Figure 11:
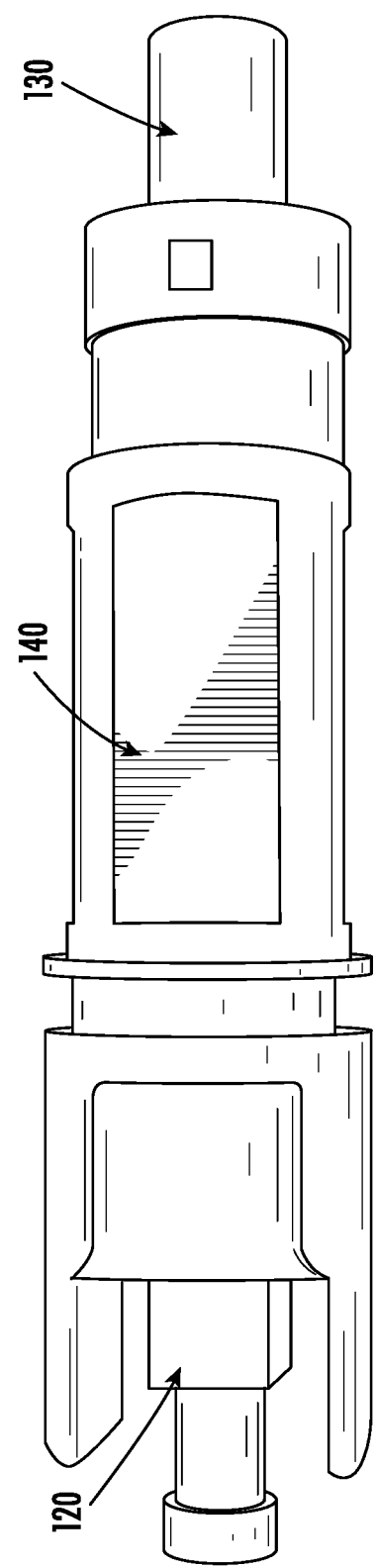

FIGS. 8-15 are views showing explanatory steps for the assembly of the reflective terminator 100. FIG. 8 depicts connector assembly 120 being secured to the body 130. In this configuration, body 130 has latch arms 130LA disposed on the plug end side for securing the connector assembly 120 thereto to form a body sub-assembly. As shown, connector assembly 120 includes a dust cap on first ferrule 124b for protecting the same. FIG. 9 shows the body sub-assembly being inserted and aligned with the passageway of the outer housing 140 in the proper orientation from the plug end PE of the outer housing 140 before securing the same. FIG. 10 depicts a plunger tool used for seating the body sub-assembly within the outer housing 140, but the use of a plunger tool is not necessary. The body sub-assembly may have a suitable friction or slight interference fit for seating the same or may have a snap-fit geometry as desired. FIG. 11 shows the body sub-assembly fully seated within the passageway of the outer housing 140 with a portion of the body sub-assembly extending beyond the rear portion RP of the outer housing 140. Then bushing 150 may be attached at the rear portion RP of the outer housing 140 if used.

Figure 14:
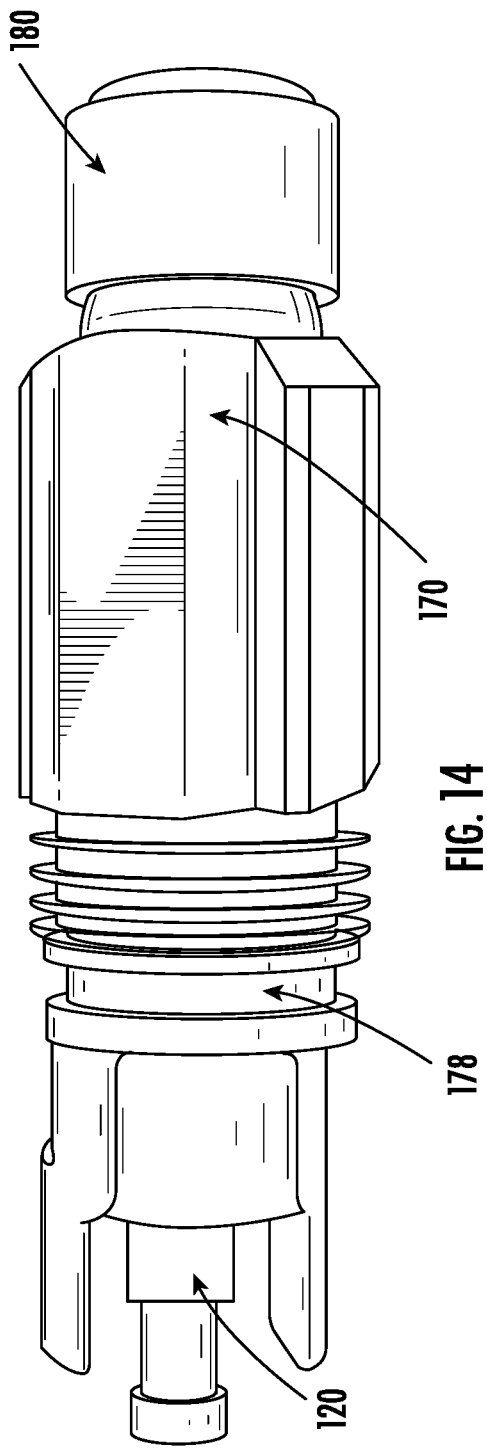
Figure 15:
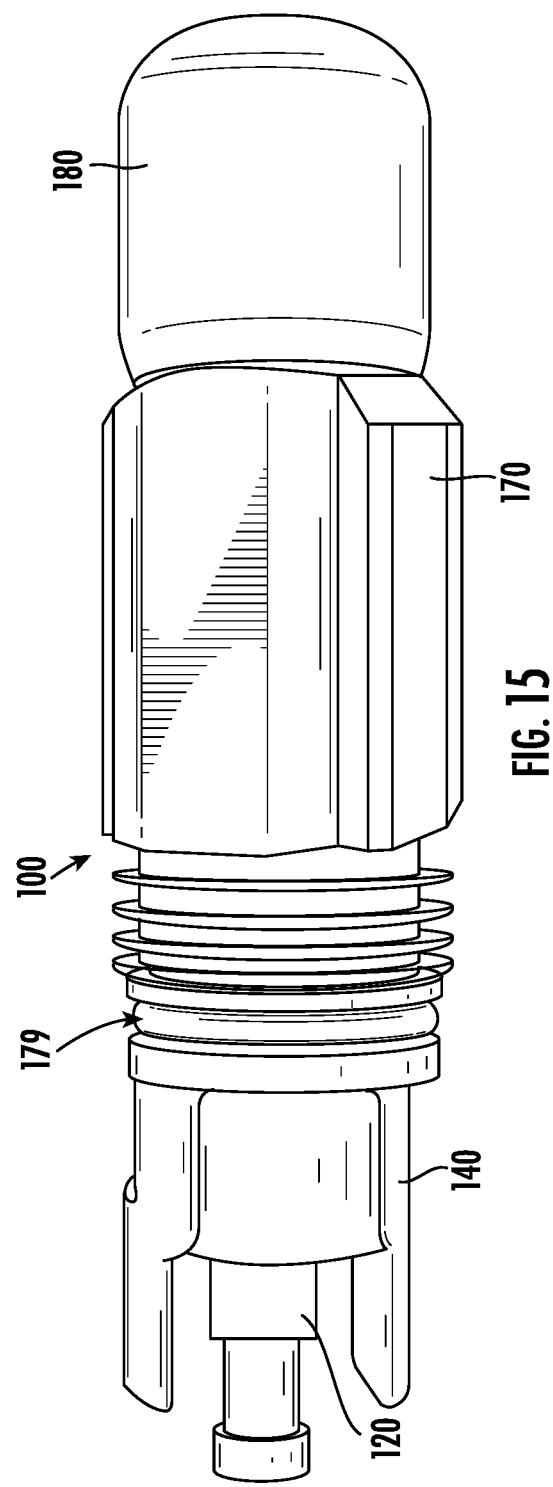

FIG. 12 shows the sealing element 160 attached to the rear portion RP of the outer housing 140. In this embodiment, the sealing element is a heat shrink, but other components may be used such as a cap with adhesive for sealing. FIG. 13 shows the coupling nut 170 being slid onto the outer housing 140 from the rear portion RP with the threaded portion of the coupling nut 170 facing the plug end PE. Then, end cap 180 is secured to the outer housing 140 for capturing the coupling nut 140, but still allowing rotation of the coupling nut 140 as shown in FIG. 14. In this embodiment, the end cap 180 has a color code (i.e., blue wavelength marking indicia) indicating the preselected wavelength for the reflective terminal. As shown, the reflective terminator 100 comprises a plug end PE with the connector interface for mating with receptacle 30 and the rear end RE has the color coding. Other wavelength marking indicia are possible to increase visibility. By way of example, FIG. 15 shows a plastic color-coded cap attached to the rear end RE of the reflective terminator to improve visibility for aerial deployments. Reflective terminator 100 may also comprise one or more O-rings for sealing. FIG. 15 shows an O-ring 179 disposed within a groove 178 of housing 170. In this embodiment, reflective terminator 100 is suitable for outside plant applications (i.e., outdoor applications); however, the concepts disclosed may be used in any suitable environment.

Outer housings 140 or the body 130 of reflector terminators may be formed from one or more components depending on the design and requirements for the device. In this particular embodiment, outer housing 140 is monolithically formed; however, other embodiments could have designs where the housings were formed from a plurality of components. Outer housing 140 or body 130 having a plurality of components could be assembled by snap-fitting, adhesive, welding or the like. Outer housing 140 may comprise one or more features for alignment during mating and may also comprise other features for securing the device. In other embodiments, the body 130 having the features for securing the connector assembly 120 may be integrally formed with the outer housing 140 to eliminate the body and reduce the part count for the reflective terminator.

Generally speaking, other than the connector assembly 120 and sealing element 160 most of the components of the reflective terminator 100 may be formed from a suitable polymer, but other materials such as metal are possible. In one example, the polymer is a UV stabilized polymer such as ULTEM 2210 available from GE Plastics if the component is exposed to the elements; however, other suitable polymer materials are possible. For instance, stainless steel or any other suitable metal may be used for various components as desired.

Figure 16:
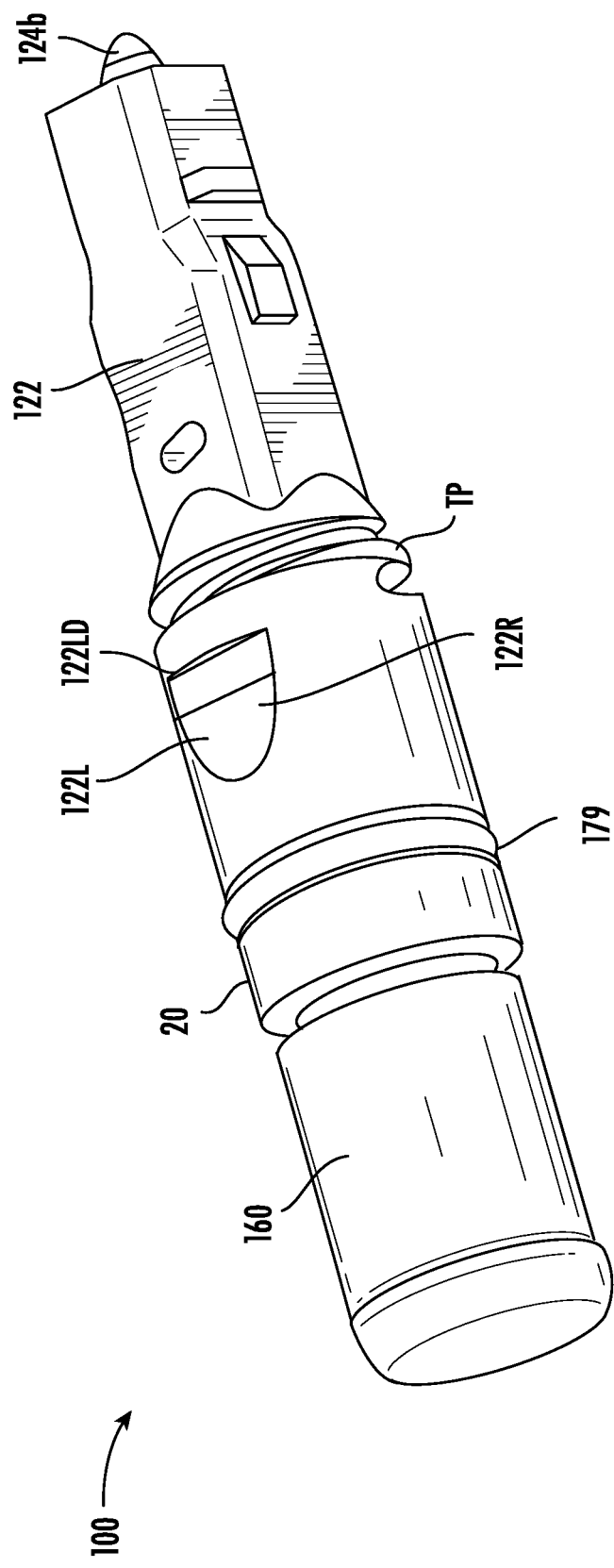
FIG. 16 is another explanatory reflective terminator for a second connector footprint that reflects optical signals according to the concepts disclosed.

FIG. 16 depicts another reflective terminator 100 using the ferrule assembly 124 in another connector footprint according to the concepts disclosed. In this embodiment, reflective terminator 100 comprises ferrule assembly 124 and a connector housing 122 that accommodates more than one connector footprint. The second footprint of the reflective terminator shown in FIG. 16 has a locking feature 122L integrally formed into the body of the connector housing 122 for securing the device in a port. As used herein, "integrally formed" means that the locking feature is made as part of connector housing so that the locking feature and connector housing are formed by a single component. Locking feature 122L allows the reflective terminator 100 to be secured in a suitable port by merely pushing the reflective terminator into the port until the securing member of the port engages the locking feature 122L. In this embodiment, the locking feature has a negatively-formed geometry from the primitive round cross-section of the connector housing 122. More specifically, the locking feature 122L is a formed as a ramp 112R with a ledge 122LD, but other suitable geometries are possible for the locking feature 122L. The ledge 122LD may have a vertical orientation with respect to the longitudinal axis of the connector housing 122, or the ledge 122LD may be canted in a forward direction or a rearward direction as desired. Since the locking feature 122L acts as the securing feature and is integrally formed into connector housing 122 no other components are needed for securing the device in a port, but variations of the reflective terminator 100 are possible.

Figure 17:
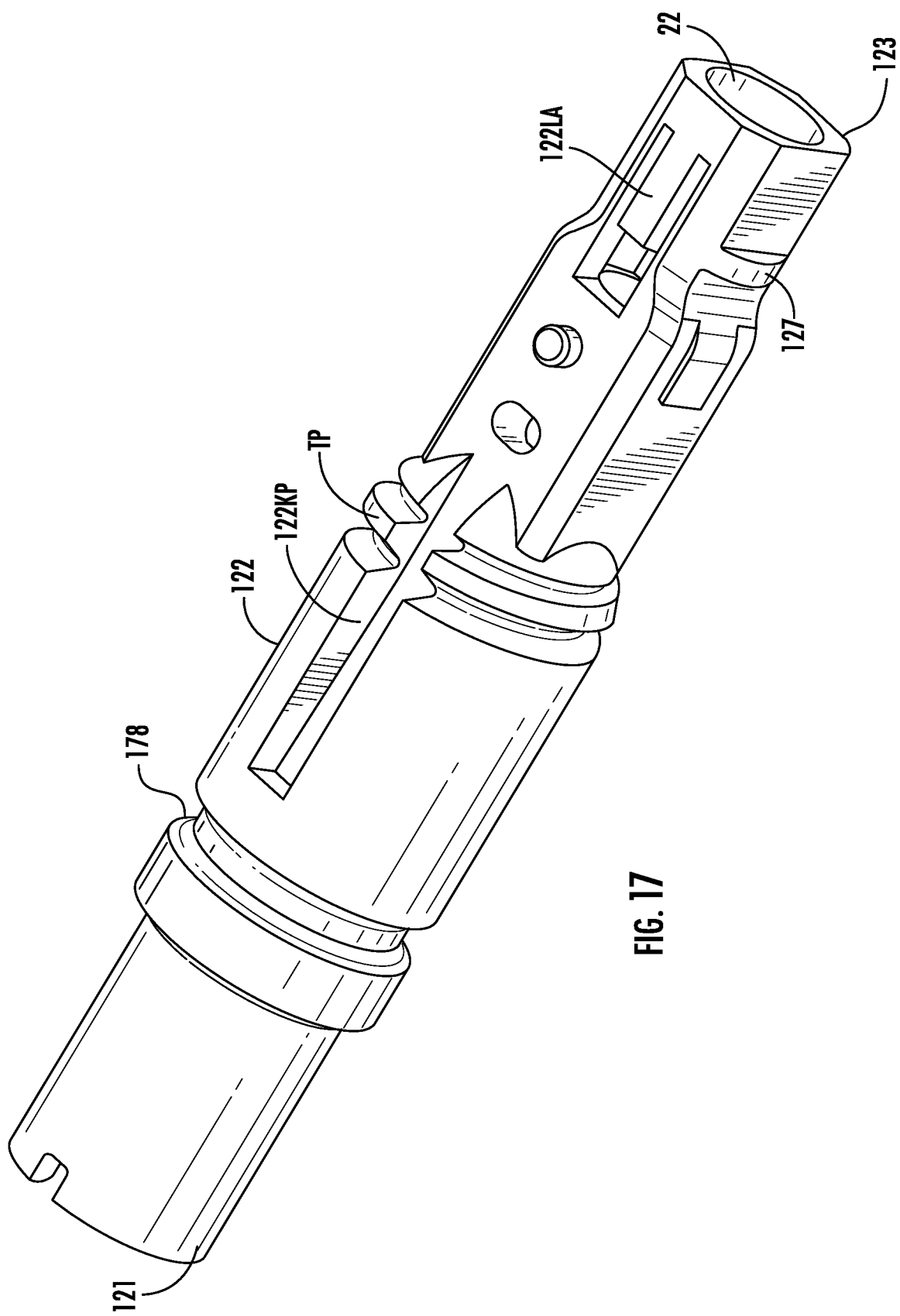
FIG. 17 is a perspective view of the connector housing of the reflective terminator of FIG. 16.

FIG. 17 is a perspective view of the connector housing 122 of FIG. 16 without the ferrule assembly 124 and sealing element 160 (if used). As shown, connector housing 122 has a passageway 22 that opens from a front end 123. Passageway 22 may extend to a rear end 121 that has an opening or the passageway 22 may only be open at the front end 123 with the rear end 121 being closed. If the passageway 22 is open at the rear end 121, then a sealing element 160 such as a heat shrink and/or cap may be used at the rear end 121 for environmentally sealing the connector housing 122 at the rear. If the rear end 121 is closed, then the sealing element 160 is not needed.

Connector housing 122 may also comprise one or more keying portions 122KP. As shown in FIG. 17, connector housing 122 has a keying portion 122KP arranged as a female keying portion, but other geometries for the keying portion 122KP are possible such as a male keying portion 122KP depending on the connector footprint desired. The female keying portion keying portion 122KP depicted in FIG. 17 extends into the threaded portion TP of the connector housing 122 as shown. Additionally, the keying portion may be arranged so that it is about 180 degrees from the locking portion 122L of connector housing 122. Connector housing 122 may also include a groove 178 for seating an O-ring 179 with a suitable port. Although, reflective terminator 100 is suitable for outside plant applications, the concepts disclosed may be used in any suitable environment.

Figure 18:
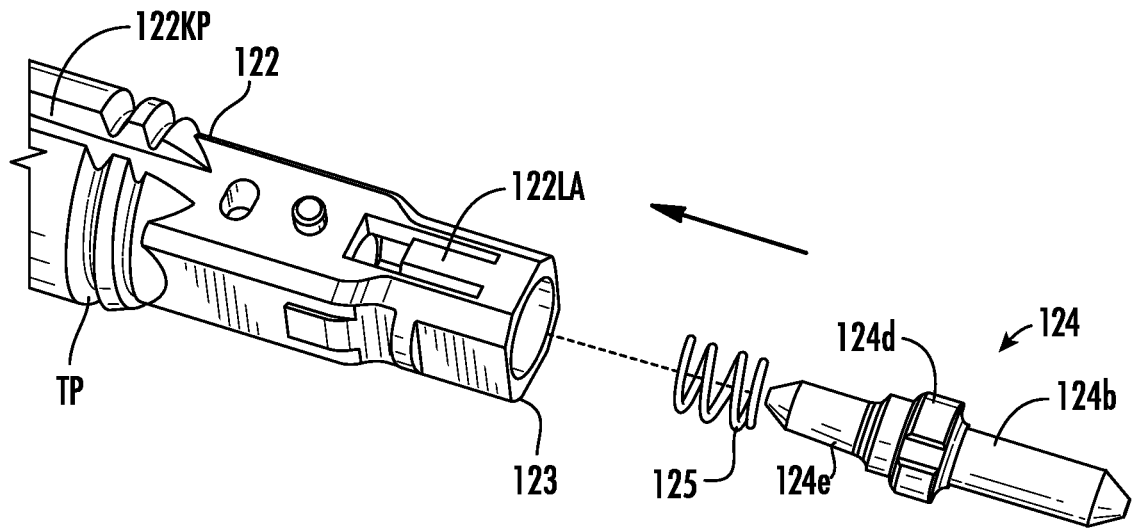
FIG. 18 is a partial perspective view of the ferrule assembly being inserted into the connector housing of FIG. 17.
Figure 19:
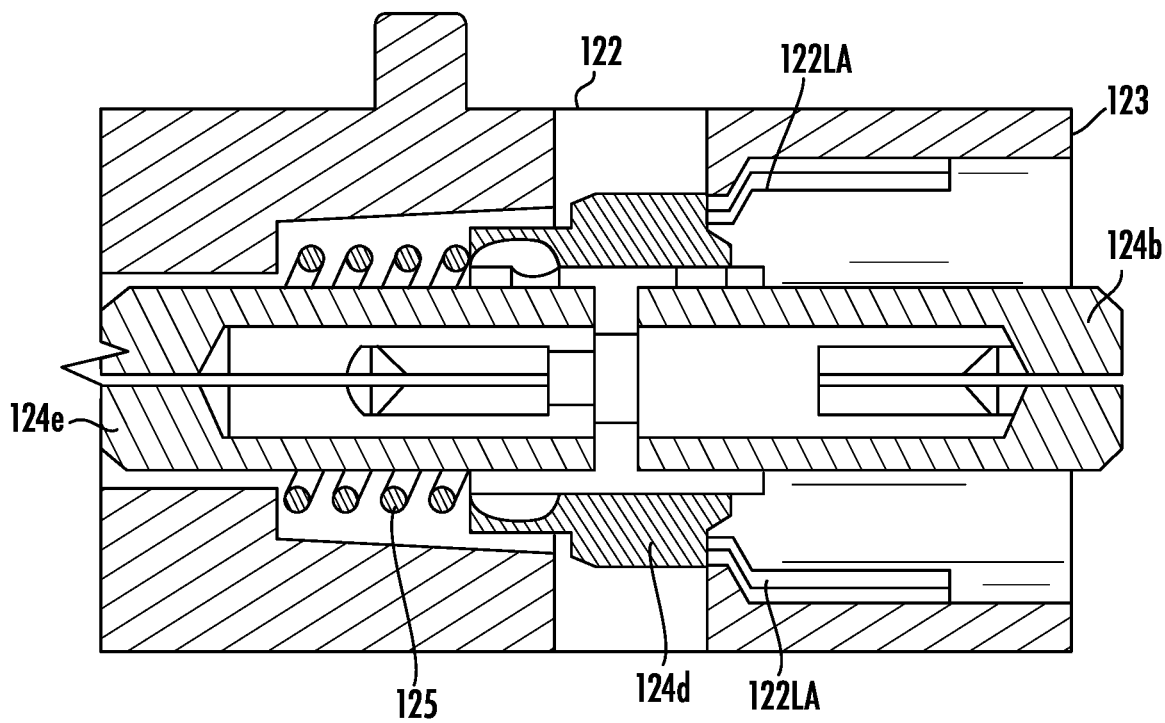
FIG. 19 is a partial cross-sectional view of the reflective terminal of FIG. 16.

FIG. 18 is a partial perspective view of the resilient member 125 and ferrule assembly 124 being inserted into the connector housing 122 from the front end 123. Resilient member 125 biases the ferrule assembly to a forward-position; however, the concepts disclosed herein may be practiced without the resilient member 125 if desired. As shown, connector housing 122 may include latch arms 122LA on opposite sides of the connector housing 122 so that the ferrule assembly 124 may be inserted from the front end 123; however, the latch arms 122LA are not necessary since the connector housing 122 may be modified so the ferrule assembly 124 is inserted from the rear end 121. In other words, the connector housing 122 could have an internal stop for the ferrule holder 124d at the front and use a spring push for securing the resilient member or ferrule assembly at the rear. FIG. 19 is a partial cross-sectional view of the assembled reflective terminal 100 showing the resilient member 125 and ferrule assembly 124 disposed within the connector housing 122.

Additionally, connector housing 122 may have a front end that may be SC compatible with the addition of a SC outer housing that snaps-on the front portion, thereby allowing the device to be compatible with an SC port or adapter. Connector housing 122 may also include ears 127 on opposing sides for allowing the device to be SC compatible.

Figure 20:
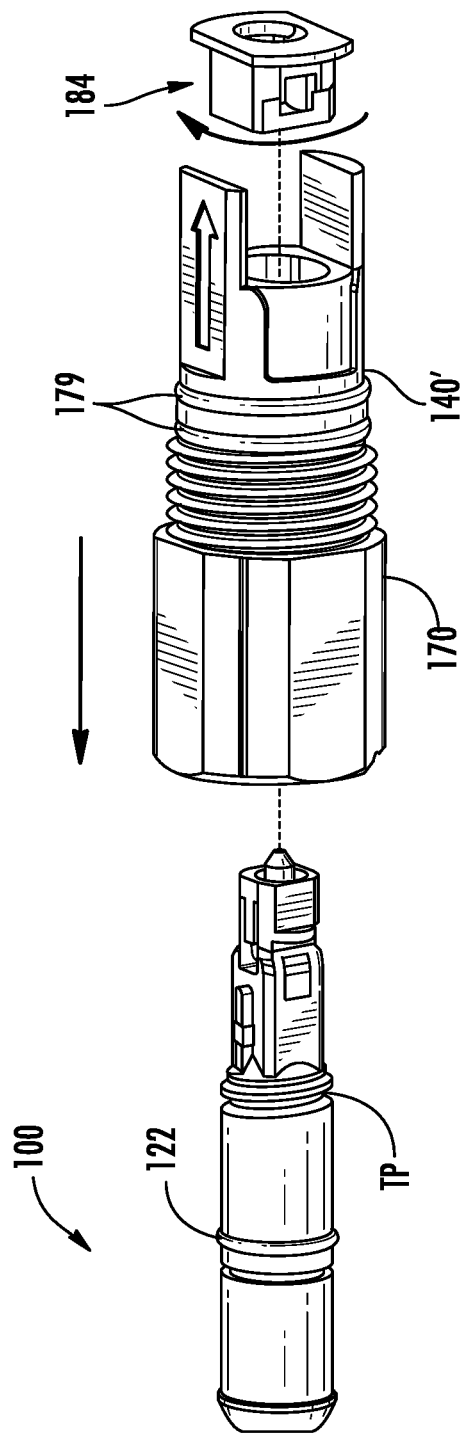
FIG. 20 is a partially exploded view of the reflective terminator of FIG. 16 along with components for converting the device.

Alternatively, the reflective terminator 100 of FIG. 16 may be converted into other connector footprints. Specifically, the connector housing 122 may further include a threaded portion TP for converting the reflective terminator 100 to a device having an OptiTap® connector footprint. FIG. 20 depicts a partially exploded view of the reflective terminator 100 of FIG. 16 with the components for converting the device to the OptiTap® connector footprint. Specifically, FIG. 20 shows the outer housing 140 that is similar to the outer housing shown FIG. 4 along with coupling nut 170 and a locking component 184. The conversion of the connector footprint for the reflective terminator 100 shown may be accomplished by threading on outer housing 140 with an internal thread 140T (FIG. 21) and securing the outer housing 140 with the locking component 184.

As represented by the arrows in FIG. 20, the outer housing 140 is positioned onto the reflective terminator 100 and then rotated so that the internal thread 140T engages the threaded portion TP of connector housing 122. In other words, outer housing 140 would be positioned onto the connector housing 122 from the front and threaded into position, and then the locking component 184 is attached to the device to inhibit the outer housing 140 from being loosened or removed. Coupling nut 170 may be placed about the outer housing 140 before or after attachment of the outer housing 140 depending on the rear construction of the reflective terminal 100 and secured in a manner that allows rotation of the coupling nut 170. Once the outer housing is properly positioned relative to the connector housing 122, then the locking component may be pushed onto the front of the device so that the latch arms snap into place for securing the components in position. Consequently, the reflective terminator 100 of FIG. 16 may have three different suitable connector configurations.

The reflective terminator 100 shown in FIG. 16 can have other similar features as described herein and such features will not be explained again for the sake of brevity. Some similar features include the construction of the ferrule assembly 124 with the first and second ferrule, the optical filter or Bragg grating, the length of the reflective terminator, the use of an end cap with or without color coding for preselected wavelengths, wavelength making indicia, dust caps or using the reflective terminator as a portion of an optical network.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A reflective terminator for optical networks, comprising:
 a ferrule assembly comprising an optical filter for reflecting one or more preselected wavelengths;
 a connector housing comprising a body, wherein the ferrule assembly is at least partially disposed within the connector housing, and the connector housing comprises a body having a female keying portion, and a locking feature integrally formed into the body of the connector housing for securing the reflective terminator, wherein the keying portion is arranged about 180 degrees from the locking feature.

2. The reflective terminator of claim 1, wherein the body of the connector housing comprises a threaded portion.

3. The reflective terminator of claim 1, wherein
 the body of the connector housing comprises a threaded portion, and the female keying portion extends into the threaded portion.

4. The reflective terminator of claim 1, wherein the locking feature comprises a ramp and a ledge.

5. The reflective terminator of claim 1, further comprising a SC outer housing.

6. The reflective terminator of claim 1, further comprising an outer housing and a coupling nut for converting the reflective terminator to a second connector footprint.

7. The reflective terminator of claim 1, wherein the locking feature integrally formed into the body of the connector housing comprises a negatively formed geometry from a primitive round cross-section of the connector housing.

8. The reflective terminator of claim 1, further comprising an O-ring on the connector housing.

9. The reflective terminator of claim 1, further comprising a sealing element at a rear end of the connector housing for environmental sealing.

10. A reflective terminator for optical networks, comprising:
   a ferrule assembly comprising an optical filter for reflecting one or more preselected wavelengths;
   a connector housing comprising a body, wherein the ferrule assembly is at least partially disposed within the connector housing, and the connector housing comprises a keying portion and a locking feature integrally formed into the body of the connector housing as a negatively formed geometry from a primitive round cross-section of the connector housing for securing the reflective terminator, wherein the locking feature comprises a ramp and a ledge.

11. The reflective terminator of claim 10, wherein the body of the connector housing comprises a threaded portion.

12. The reflective terminator of claim 10, wherein the keying portion is a female keying portion.

13. The reflective terminator of claim 10, wherein the keying portion is arranged about 180 degrees from the locking feature.

14. The reflective terminator of claim 10, wherein the body of the connector housing comprises a threaded portion and the keying portion is a female keying portion, and the female keying portion extends into the threaded portion.

15. The reflective terminator of claim 10, further comprising a SC outer housing.

16. The reflective terminator of claim 10, further comprising an outer housing and a coupling nut for converting the reflective terminator to a second connector footprint.

17. The reflective terminator of claim 10, further comprising an O-ring on the connector housing.

18. The reflective terminator of claim 10, further comprising a sealing element at a rear end of the connector housing for environmental sealing.

19. A reflective terminator for optical networks, comprising:
   a ferrule assembly comprising an optical filter for reflecting one or more preselected wavelengths;
   a connector housing comprising a body, wherein the ferrule assembly is at least partially disposed within the connector housing, and the connector housing comprises a keying portion and a locking feature integrally formed into the body of the connector housing as a negatively formed geometry from a primitive round cross-section of the connector housing for securing the reflective terminator, and a O-ring disposed on the connector housing.

20. The reflective terminator of claim 19, wherein the body of the connector housing comprises a threaded portion.

21. The reflective terminator of claim 19, wherein the keying portion is a female keying portion.

22. The reflective terminator of claim 19, wherein the keying portion is arranged about 180 degrees from the locking feature.

23. The reflective terminator of claim 19, wherein the body of the connector housing comprises a threaded portion and a female keying portion, and the female keying portion extends into the threaded portion.

24. The reflective terminator of claim 19, wherein the locking feature comprises a ramp and a ledge.

25. The reflective terminator of claim 19, further comprising a SC outer housing.

26. The reflective terminator of claim 19, further comprising an outer housing and a coupling nut for converting the reflective terminator to a second connector footprint.

27. The reflective terminator of claim 19, further comprising a sealing element at a rear end of the connector housing for environmental sealing.

* * * * *